United States Patent
Marupaduga et al.

(10) Patent No.: US 11,438,791 B1
(45) Date of Patent: Sep. 6, 2022

(54) MITIGATING PACKET LOSS AT A CELL SITE ROUTER

(71) Applicant: Sprint Spectrum LP, Overland Park, KS (US)

(72) Inventors: Sreekar Marupaduga, Overland Park, KS (US); Rajveen Narendran, Olathe, KS (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 0 days.

(21) Appl. No.: 16/782,552

(22) Filed: Feb. 5, 2020

(51) Int. Cl.
*H04W 28/02* (2009.01)
*H04L 45/28* (2022.01)
*H04L 1/00* (2006.01)
*H04W 28/04* (2009.01)
*H04W 24/04* (2009.01)

(52) U.S. Cl.
CPC ....... *H04W 28/0278* (2013.01); *H04L 1/0026* (2013.01); *H04L 45/28* (2013.01); *H04W 24/04* (2013.01); *H04W 28/0242* (2013.01); *H04W 28/0268* (2013.01); *H04W 28/04* (2013.01)

(58) Field of Classification Search
CPC ............. H04L 43/0829; H04L 43/0835; H04L 43/0841; H04L 47/14; H04L 47/522; H04L 47/54; H04W 28/0242; H04W 28/0247; H04W 28/0289; H04W 28/06

See application file for complete search history.

(56) References Cited

U.S. PATENT DOCUMENTS

| | | | |
|---|---|---|---|
| 8,184,528 B2 | 5/2012 | Parker | |
| 9,565,645 B1* | 2/2017 | Burford | H04W 56/006 |
| 9,642,032 B2 | 5/2017 | Berzin et al. | |
| 2005/0262266 A1 | 11/2005 | Wiberg et al. | |
| 2014/0003243 A1* | 1/2014 | Nadas | H04W 28/0289 370/235 |
| 2014/0355439 A1* | 12/2014 | Kakadia | H04L 47/522 370/235 |
| 2017/0118672 A1* | 4/2017 | Zhang | H04W 28/0289 |
| 2018/0183717 A1* | 6/2018 | Panchal | H04L 47/2475 |
| 2019/0166061 A1* | 5/2019 | Farkas | H04L 47/621 |
| 2021/0029580 A1* | 1/2021 | Gupta | H04W 28/0289 |

FOREIGN PATENT DOCUMENTS

WO 2019089027 A1 5/2019

\* cited by examiner

*Primary Examiner* — Pao Sinkantarakorn

(57) ABSTRACT

A cell site router communicatively coupled to an access node and configured to transmit data between the access node and an external network is further configured to determine a packet loss occurring at a port of the cell site router and adjust a size of a buffer of the cell site router based on the packet loss. The buffer can be associated with the port and/or a RAT associated with the port, and a latency requirement of the data transmission can be considered when adjusting buffer sizes.

17 Claims, 6 Drawing Sheets

MITIGATING PACKET LOSS AT A CELL SITE ROUTER

TECHNICAL BACKGROUND

As wireless networks evolve and grow, there are ongoing challenges in providing high-quality service to increasing numbers of wireless devices in various coverage areas of a wireless network. Different wireless devices are configured to use different types of applications (such as voice over IP, streaming, gaming, etc.), and each different application may optimally function with a different channel size or bandwidth. Further, radio access technologies (RATs) such as 5G New Radio (NR) are being implemented alongside existing RATs such as 3G and 4G Long Term Evolution (LTE), and wireless devices are increasingly becoming more capable of connecting to these RATs. Further, different RATs can be associated with different types of data transmissions, such as voice, data, streaming, low-latency, high-latency, etc. In other words, different RATs are utilized for applications that require different quality of service (QoS). These different types of network using various RATs and types of data transmissions may be referred to as heterogeneous networks.

However, there are problems associated with deployment of heterogenous networks. In particular, when different types data transmissions (i.e. utilizing different RATs and having different QoS requirements) traverse the various network nodes between a source node and a destination node, the data transmissions may encounter buffers that are not suitably sized to handle these differences. In particular, a cell site router that is located in the wireless network between an access node and a gateway node may include one or more ports through which these data transmissions are forwarded, and further comprise buffers associated with the ports. If these buffers are too small, then packet losses may occur, resulting in a sub-optimal user experience for users of wireless devices that are transmitting or receiving these data transmissions.

OVERVIEW

Exemplary embodiments described herein include systems and methods for mitigating packet loss at a cell site router, the method including determining a packet loss associated with a data transmission between a source node and a destination node, and adjusting a size of a buffer of the cell site router based in part on the packet loss.

An exemplary system described herein for mitigating packet loss at a cell site router includes an access node configured to provide wireless services to a wireless device attached to the access node, a cell site router communicatively coupled to the access node, the cell site router configured to transmit data between the access node and an external network, and a processor communicatively coupled to the cell site router. The processor is configured to perform operations including determining a packet loss occurring at a port of the cell site router, and adjusting a size of a buffer of the cell site router based on the packet loss, wherein the buffer is associated with the port.

An exemplary processing node described herein for mitigating packet loss at a cell site router is configured to perform operations including determining a packet loss associated with a data transmission between a wireless device and a destination node, wherein the data transmission is associated with a quality of service requirement, and adjusting a size of a buffer of the cell site router based in part on the packet loss and the quality of service requirement.

DETAILED DESCRIPTION

Figure 1:
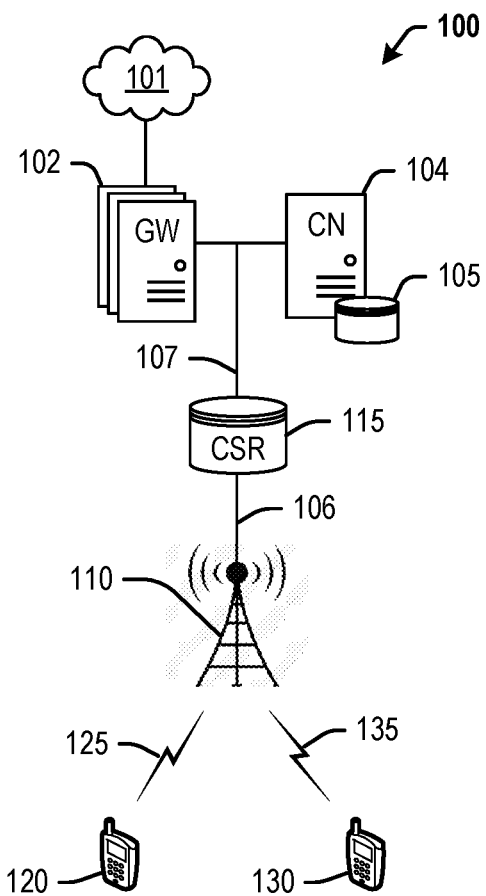
FIG. 1 depicts an exemplary system for mitigating packet loss at a cell site router.

Exemplary embodiments described herein include systems and methods for mitigating packet losses at a cell site router by adjusting a buffer size of the cell site router. Exemplary cell site routers described herein include any node that is configured to route incoming data packets from a network/gateway node to an access node, and to route outgoing data packets from the access node (and originating at wireless devices attached thereto) to the network/gateway node. As described above, dropped packets occurring as a result of static buffer sizes at cell site routers can negatively impact an overall throughput and quality of service for wireless devices, particularly when the access nodes serving the wireless devices are heavily loaded. Thus, exemplary embodiments described herein disclose dynamic buffer size adjustments at different ports of a cell site router to minimize the packet drops. Further, since increasing the buffer size can increase a latency of a data transmission, a latency requirement of the wireless device is also considered when adjusting buffer sizes, so as to minimize impacts to the latency and/or other QoS requirements. Buffers can further be dynamically and automatically adjusted based on historical trends of packet losses at different times of the day.

Thus, an exemplary method described herein for mitigating packet loss at a cell site router includes determining a packet loss associated with a data transmission between a source node and a destination node, and adjusting a size of a buffer of the cell site router based in part on the packet loss. The cell site router may include a plurality of ports, each associated with a different radio access technology. For example, data transmissions using 4G are transmitted via a 4G port of the cell site router, data transmissions using 5G are transmitted via a 5G port of the cell site router, and so on. Further, each port may be associated with a separate buffer. In other words, buffer size adjustment can be performed for different buffers associated with corresponding different ports. Thus, wireless devices attached to an access node using a specific radio access technology (e.g. 4G, 5G, TDD, FDD, etc.) are ensured quality of service based on real-time adjustment of buffers associated with the specific radio access technology. For example, packet losses at each port can be monitored in real time, and the size of the one or more different buffers can be adjusted based in part on the packet loss determined at each port.

In an exemplary embodiment, the data transmission is associated with a QoS requirement, and the adjustment of the size of the buffer is limited so as to maintain the QoS requirement. For example, the QoS requirement can include a low latency requirement as may be required by applications such as voice over IP (VoIP), gaming, etc. For data transmissions associated with these types of applications and/or QoS requirements, the adjustment of the size of the buffer may be limited. For example, while increasing a buffer size can improve or mitigate packet losses, it can also increase a latency of a data transmission, as more packets get queued in a larger buffer, resulting in longer times to process the queue of packets. Thus, if a data transmission is associated with a low latency requirement, the buffer size may not be increased, or may be increased by a very limited amount. The latency (or any other QoS parameter) can be monitored, and the requirement satisfied by limiting adjustment of the buffer. In an exemplary embodiment, adjusting the size of the buffer is performed selectively based on a quality of service class identifier (QCI) of the data transmission, since the QCI is associated with different QoS requirements and/or parameters.

As described herein, responsive to determining an increase in the packet loss, the size of the buffer can be increased. In an exemplary embodiment, the size of the buffer is increased responsive to determining that the packet loss has increased beyond a corresponding incremental threshold. Alternatively or in addition, the size of the buffer is increased by a predefined amount associated with the corresponding incremental threshold. Similarly, responsive to determining that the packet loss decreases, the size of the buffer may be reduced. Further, the size of the buffer is reduced responsive to determining that the packet loss has decreased beyond a corresponding incremental threshold. The size of the buffer may be reduced by a predefined amount associated with the corresponding incremental threshold decrease in the packet loss. A hysteresis threshold may be used to determine when to increase or decrease the buffer size.

In an exemplary embodiment, the source node is a wireless device attached to the access node, the destination node is associated with an external network communicatively coupled to the gateway node, and the cell site router is configured to receive the data transmission from the access node and transmit the data transmission to the destination node via the gateway node. In other words, the data transmission may be an uplink data transmission. Alternatively or in addition, the source node is associated with an external network communicatively coupled to the gateway node, the destination node is a wireless device attached to the access node, and the cell site router is configured to receive the data transmission from the source node and transmit the data transmission to the wireless device via the access node. In other words, the data transmission can be a downlink data transmission. In either case, the uplink and/or the downlink data transmission traverses a buffer of the cell site router, the buffer being associated with a RAT that the data transmission utilizes, such as 3G, 4G, 5G, TDD, FDD, etc.

Further described herein is a system for mitigating packet loss at a cell site router by determining a packet loss occurring at a port of the cell site router, and adjusting a size of a buffer of the cell site router based on the packet loss, wherein the buffer is associated with the port. The wireless device can attach to the access node using a radio access technology (RAT). The packet loss is determined for a data transmission using the RAT. Thus, the port is associated with the RAT. The RAT comprises one or more of time-division-duplexing (TDD), frequency-division-duplexing (FDD), 3G, 4G, or 5G. Further described herein is a processing node for mitigating packet loss at a cell site router by determining a packet loss associated with a data transmission between a wireless device and a destination node, wherein the data transmission is associated with a quality of service requirement, and adjusting a size of a buffer of the cell site router based in part on the packet loss and the quality of service requirement. The quality of service requirement may comprise a latency requirement, such as a high latency requirement, and the operations can include limiting or minimizing adjustment of the size of the buffer to satisfy the latency requirement. These and other embodiments are further described with reference to FIGS. 1-8 below.

FIG. 1 depicts an exemplary system for mitigating packet loss at a cell site router. System 100 comprises a communication network 101, gateway node(s) 102, controller node 104, access node 110, cell site router 115, and wireless devices 120 and 130. In other embodiments, any other combination of cell site routers, access nodes, and wireless devices may be evident to those having ordinary skill in the art in light of this disclosure. In this exemplary embodiment, access node 110 may be a macrocell access node configured to deploy wireless air-interfaces 125, 135 to which wireless devices 120, 130 can respectively attach. For example, access node 110 can include a combination of a 4G eNodeB and a 5G gNodeB. In other words, the access node 110 can comprise antennae that are configured to communicate using 4G LTE (i.e. the first RAT) as well as antennae that are configured to communicate using 5G NR (the second RAT). Further, the access node 110 can include a plurality of antennae (or antenna elements), a portion of which is configured to deploy a first bandwidth or RAT (e.g. 4G LTE), and a portion of which is configured to deploy a second bandwidth or RAT (e.g. 5G NR). Consequently, wireless devices 120, 130 are respectively capable of attaching to 4G and 5G RATs. Further, cell site router 115 includes any node that is configured to route incoming data packets from network 101 and/or gateway node(s) 102 to access node 110 (and wireless devices 120, 130), and to route outgoing data packets received from the access node 110 (and originating at wireless devices 120, 130) to the gateway node(s) 102 and/or network 101.

Further, as described herein, cell site router 115 is configured to mitigate packet losses by adjusting a size of a buffer located within cell site router 115. The buffers may be associated with different ports of cell site router 115 (e.g. a 4G port and a 5G port), to minimize the packet drops for one or more of the 4G and 5G data transmissions. Further, since increasing the buffer size can increase a latency of a data transmission, a latency requirement of the wireless devices 120, 130 is also considered when adjusting buffer sizes, so as to minimize impacts to the latency and/or other QoS requirements.

Access node 110 can be any network node configured to provide communication between wireless devices 120, 130 and communication network 101, including standard access nodes such as a macro-cell access node, base transceiver station, a radio base station, an eNodeB device, an enhanced eNodeB device, or the like. In an exemplary embodiment, a macro-cell access node 110 can have a coverage area in the range of approximately five kilometers to thirty-five kilometers and an output power in the tens of watts. Further, access node 110 may comprise any short range, low power, small-cell access nodes such as a microcell access node, a picocell access node, a femtocell access node, or a home eNodeB device.

Access node 110 can comprise a processor and associated circuitry to execute or direct the execution of computer-readable instructions to perform operations such as those further described herein. Briefly, access node 110 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Further, access node 110 can receive instructions and other input at a user interface. Access node 110 communicates with gateway node 102 and controller node 104 via communication links 106, 107.

Wireless device 120 may be any device, system, combination of devices, or other such communication platform capable of communicating wirelessly with access node 110 using one or more frequency bands deployed therefrom. Wireless device 120 may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can send and receive audio or data. Other types of communication platforms are possible.

Communication network 101 can be a wired and/or wireless communication network, and can comprise processing nodes, routers, gateways, and physical and/or wireless data links for carrying data among various network elements, including combinations thereof, and can include a local area network a wide area network, and an internetwork (including the Internet). Communication network 101 can be capable of carrying data, for example, to support voice, push-to-talk, broadcast video, and data communications by wireless devices 120, 130. Wireless network protocols can comprise MBMS, code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by communication network 101 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 101 can also comprise additional base stations, controller nodes, telephony switches, internet routers, network gateways, computer systems, communication links, or some other type of communication equipment, and combinations thereof.

Communication links 106, 107 can use various communication media, such as air, space, metal, optical fiber, or some other signal propagation path—including combinations thereof. Communication links 106, 107 can be wired or wireless and use various communication protocols such as Internet, Internet protocol (IP), local-area network (LAN), optical networking, hybrid fiber coax (HFC), telephony, T1, or some other communication format—including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Communication links 106, 107 may include S1, S4, S5, S11, S1-MME, or S1-U communication links. Other wired or wireless protocols can also be used. Communication links 106, 107 can be a direct link or might include various equipment, intermediate components, systems, and networks. Communication links 106, 107 may comprise many different signals sharing the same link.

Gateway node(s) 102 can be any network node configured to interface with other network nodes using various protocols. Gateway node(s) 102 can communicate user data over system 100. Gateway node(s) 102 can be standalone computing devices, computing systems, or network components, and can be accessible, for example, by a wired or wireless connection, or through an indirect connection such as through a computer network or communication network. For example, gateway node(s) 102 can include a serving gateway (S-GW) and/or a public data network gateway (P-GW), etc. One of ordinary skill in the art would recognize that gateway node(s) 102 are not limited to any specific technology architecture, such as Long Term Evolution (LTE) and can be used with any network architecture and/or protocol.

Each of gateway node(s) 102 can comprise a processor and associated circuitry to execute or direct the execution of computer-readable instructions to obtain information. Gateway node(s) 102 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Gateway node(s) 102 can receive instructions and other input at a user interface.

Controller node 104 can be any network node configured to communicate information and/or control information over system 100. Controller node 104 can be configured to transmit control information associated with a handover procedure. Controller node 104 can be a standalone computing device, computing system, or network component, and can be accessible, for example, by a wired or wireless connection, or through an indirect connection such as through a computer network or communication network. For example, controller node 104 can include a mobility management entity (MME), a Home Subscriber Server (HSS), a Policy Control and Charging Rules Function (PCRF), an authentication, authorization, and accounting (AAA) node, a rights management server (RMS), a subscriber provisioning server (SPS), a policy server, etc. One of ordinary skill in the art would recognize that controller node 104 is not limited to any specific technology architecture, such as Long Term Evolution (LTE) and can be used with any network architecture and/or protocol.

Controller node 104 can comprise a processor and associated circuitry to execute or direct the execution of computer-readable instructions to obtain information. Controller node 104 can retrieve and execute software from storage, which can include a disk drive, a flash drive, memory circuitry, or some other memory device, and which can be local or remotely accessible. In an exemplary embodiment, controller node 104 includes a database 105 for storing information related to elements within system 100, such as historical trends of packet losses at cell site router 115, associations between buffer size adjustments and different QoS requirements, and so on. This information may be requested by or shared with cell site router 115, gateway node(s) 102 and/or access node 110 via communication links 106, 107, X2 connections, and so on. The software comprises computer programs, firmware, or some other form of machine-readable instructions, and may include an operating system, utilities, drivers, network interfaces, applications, or some other type of software, and combinations thereof. For example, a processing node within controller node 104 can perform the operations described herein. Further, controller node 104 can receive instructions and other input at a user interface.

Other network elements may be present in system 100 to facilitate communication but are omitted for clarity, such as base stations, base station controllers, mobile switching centers, dispatch application processors, and location registers such as a home location register or visitor location register. Furthermore, other network elements that are omitted for clarity may be present to facilitate communication, such as additional processing nodes, routers, gateways, and physical and/or wireless data links for carrying data among the various network elements, e.g. between access node 110 and communication network 101.

Figure 2:
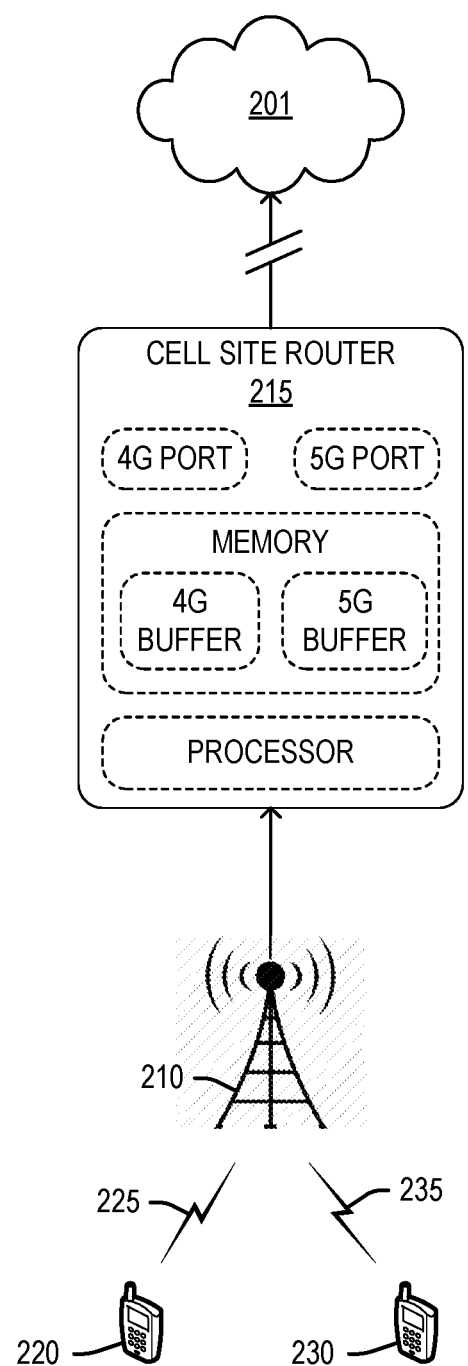
FIG. 2 depicts a schematic of an exemplary cell site router for mitigating packet loss.

FIG. 2 depicts a schematic of an exemplary cell site router. Similar to system 100, cell site router 215 is illustrated as being coupled to an access node 210, and capable of communicating with core network 202 (which can include gateway nodes, controller nodes, and other interfaces to an external network). Cell site router 215 can include any node that is configured to route data packets between core network 202 and access node 210 via one or more ports. In addition to a processor and a memory, cell site router 215 is illustrated as having 4G ports and 5G ports which are used to transport data packets that are associated with 4G and/or 5G RATs. In addition, the memory stores at least a 4G buffer and a 5G buffer, respectively associated with the 4G port and the 5G port. Further, cell site router 215 (or a processing node communicatively coupled thereto) is configured to determine a packet loss associated with a data transmission between a source node and a destination node, and adjusting a size of a buffer of the cell site router 215 based in part on the packet loss. The source node may be any of wireless devices 220, 230, and the destination node can be any node associated with network 201, such that the cell site router 215 is configured to receive a data transmission from the access node 210, and forward the data transmission to the destination node (via the network 201 and/or any intervening gateway nodes). In other words, the data transmission may be an uplink data transmission. Alternatively or in addition, the source node is any network node associated with network 201, the destination node is one of wireless devices 220, 230 attached to the access node 210, and the cell site router 215 is configured to receive the data transmission from the source node and transmit the data transmission to the wireless device 220, 230 via the access node 210. In other words, the data transmission can be a downlink data transmission.

In either case, the uplink and/or the downlink data transmission traverses a buffer of the cell site router 215 that is associated with a RAT that the data transmission utilizes, such as 3G, 4G, 5G, TDD, FDD, etc. Thus, the cell site router 215 may include a plurality of ports as shown herein, each associated with a different radio access technology. For example, data transmissions using 4G are transmitted via a 4G port of the cell site router 215, data transmissions using 5G are transmitted via a 5G port of the cell site router 215, and so on. Further, each port may be associated with a separate buffer. In other words, buffer size adjustment can be performed for different buffers associated with corresponding different ports. Thus, wireless devices 220, 230 attached to access node 210 using a specific radio access technology (e.g. 4G, 5G, TDD, FDD, etc.) are ensured quality of service based on real-time adjustment of buffers associated with the specific radio access technology. For example, packet losses at the 4G port and associated with a data transmission using the 4G RAT 225 can be monitored in real time, and the size of the 4G buffer can be adjusted based in part on the packet loss determined thereat. Similarly, packet losses at the 5G port and associated with a data transmission using the 5G RAT 235 can be monitored in real time, and the size of the 5G buffer can be adjusted based in part on the packet loss determined thereat.

Further, the data transmission on either RAT 225, 235 can be associated with a QoS requirement of wireless devices 220, 230 respectively, and the adjustment of the size of the 4G or 5G buffer is limited so as to maintain the QoS requirement. For example, the QoS requirement can include a low latency requirement as may be required by applications such as voice over IP (VoIP), gaming, etc. For data transmissions associated with these types of applications and/or QoS requirements, the adjustment of the size of the buffer may be limited. For example, while increasing a buffer size can improve or mitigate packet losses, it can also increase a latency of a data transmission, as more packets get queued in a larger buffer, resulting in longer times to process the queue of packets. Thus, if a data transmission is associated with a low latency requirement, the buffer size may not be increased, or may be increased by a very limited amount. The latency (or any other QoS parameter) can be monitored, and the requirement satisfied by limiting adjustment of the buffer. In an exemplary embodiment, adjusting the size of the buffer is performed selectively based on a quality of service class identifier (QCI) of the data transmission, since the QCI is associated with different QoS requirements and/or parameters.

As described herein, responsive to determining an increase in the packet loss, the size of the buffer can be increased. In an exemplary embodiment, the size of the buffer is increased responsive to determining that the packet loss has increased beyond a corresponding incremental threshold. Alternatively or in addition, the size of the buffer is increased by a predefined amount associated with the corresponding incremental threshold. Similarly, responsive to determining that the packet loss decreases, the size of the buffer may be reduced. Further, the size of the buffer is reduced responsive to determining that the packet loss has decreased beyond a corresponding incremental threshold. The size of the buffer may be reduced by a predefined amount associated with the corresponding incremental threshold decrease in the packet loss. A hysteresis threshold may be used to determine when to increase or decrease the buffer size.

Figure 3:
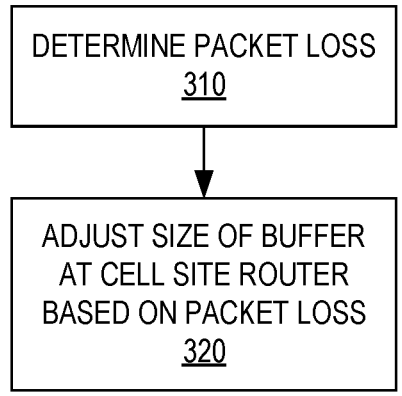
FIG. 3 depicts an exemplary method for mitigating packet loss at a cell site router.

FIG. 3 depicts an exemplary method for mitigating packet loss at a cell site router. The exemplary method of FIG. 3 may be implemented using components similar to those described above, such as cell site router 115, 215. Although FIG. 3 depicts steps performed in a particular order for purposes of illustration and discussion, the operations discussed herein are not limited to any particular order or arrangement. One skilled in the art, using the disclosures provided herein, will appreciate that various features described herein can be omitted, rearranged, combined, and/or adapted in various ways.

Figure 4:
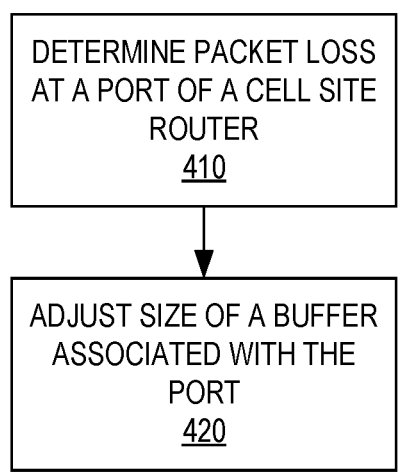
FIG. 4 depicts another exemplary method for mitigating packet loss at a cell site router.

At 310, the method includes determining a packet loss (occurring, for instance, as a result of a fixed buffer size at a cell site router) and, at 320, the size of the buffer is adjusted to mitigate the packet loss. The packet loss can be associated with a data transmission between a source node and a destination node. For example, the source node can be a wireless device attached to the access node, the destination node can be any node associated with an external network communicatively coupled to the gateway node, and the cell site router is configured to receive the data transmission from the access node and transmit the data transmission to the destination node via the gateway node. In other words, the data transmission may be an uplink data transmission. Alternatively or in addition, the source node is any node associated with an external network communicatively coupled to the gateway node, the destination node is a wireless device attached to the access node, and the cell site router is configured to receive the data transmission from the source node and transmit the data transmission to the wireless device via the access node. In other words, the data transmission can be a downlink data transmission. In either case, the uplink and/or the downlink data transmission traverses a buffer of the cell site router. For example, the packet losses at the cell site router can be monitored in real time, and the size of the buffer can be adjusted based in part on the packet loss determined at each port. Responsive to determining an increase in the packet loss, the size of the buffer can be increased. Thus, wireless devices attached to an access node are ensured quality of service based on real-time adjustment of buffers at the cell site router. In an exemplary embodiment, the size of the buffer is increased responsive to determining that the packet loss has increased beyond a corresponding incremental threshold. Alternatively or in addition, the size of the buffer is increased by a predefined amount associated with the corresponding incremental threshold. Similarly, responsive to determining that the packet loss decreases, the size of the buffer may be reduced. Further, the size of the buffer is reduced responsive to determining that the packet loss has decreased beyond a corresponding incremental threshold. The size of the buffer may be reduced by a predefined amount associated with the corresponding incremental threshold decrease in the packet loss. A hysteresis threshold may be used to determine when to increase or decrease the buffer size. Further, FIG. 4 depicts another exemplary method for mitigating packet loss at a cell site router. The exemplary method of FIG. 4 may be implemented using components similar to those described above, such as cell site router 115, 215. Although FIG. 4 depicts steps performed in a particular order for purposes of illustration and discussion, the operations discussed herein are not limited to any particular order or arrangement. One skilled in the art, using the disclosures provided herein, will appreciate that various features described herein can be omitted, rearranged, combined, and/or adapted in various ways.

At 410, a packet loss is determined at a port of a cell site router and, at 420, the size of the buffer associated with the port is adjusted. A cell site router may include a plurality of ports, each associated with a different radio access technology. For example, data transmissions using 4G are transmitted via a 4G port of the cell site router, data transmissions using 5G are transmitted via a 5G port of the cell site router, and so on. Further, each port may be associated with a separate buffer. In other words, buffer size adjustment can be performed for different buffers associated with corresponding different ports. Thus, wireless devices attached to an access node using a specific radio access technology (e.g. 4G, 5G, TDD, FDD, etc.) are ensured quality of service based on real-time adjustment of buffers associated with the specific radio access technology. For example, packet losses at each port can be monitored in real time, and the size of the one or more different buffers can be adjusted based in part on the packet loss determined at each port. As described herein, responsive to determining an increase in the packet loss, the size of the buffer can be increased. In an exemplary embodiment, the size of the buffer is increased responsive to determining that the packet loss has increased beyond a corresponding incremental threshold. Alternatively or in addition, the size of the buffer is increased by a predefined amount associated with the corresponding incremental threshold. Similarly, responsive to determining that the packet loss decreases, the size of the buffer may be reduced. Further, the size of the buffer is reduced responsive to determining that the packet loss has decreased beyond a corresponding incremental threshold. The size of the buffer may be reduced by a predefined amount associated with the corresponding incremental threshold decrease in the packet loss. A hysteresis threshold may be used to determine when to increase or decrease the buffer size.

Figure 5:
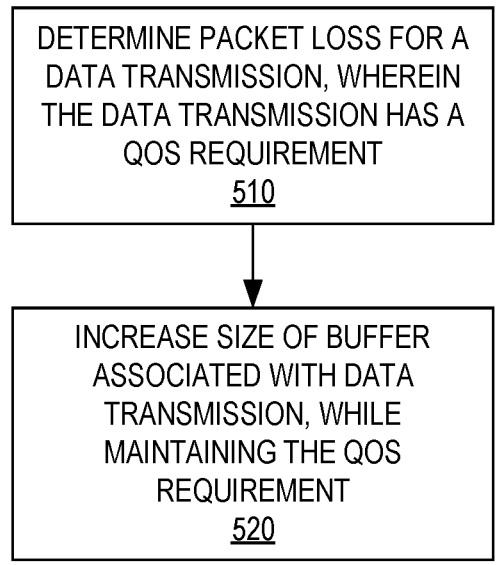
FIG. 5 depicts another exemplary method for mitigating packet loss at a cell site router.

FIG. 5 depicts another exemplary method for mitigating packet loss at a cell site router. The exemplary method of FIG. 5 may be implemented using components similar to those described above, such as cell site router 115, 215. Although FIG. 5 depicts steps performed in a particular order for purposes of illustration and discussion, the operations discussed herein are not limited to any particular order or arrangement. One skilled in the art, using the disclosures provided herein, will appreciate that various features described herein can be omitted, rearranged, combined, and/or adapted in various ways.

At 510, at packet loss is determined for a data transmission having a QoS requirement and, at 520, a size of a buffer associated with the data transmission is increased while maintaining the QoS requirement. For example, the QoS requirement can include a low latency requirement as may be required by applications such as voice over IP (VoIP), gaming, etc. For data transmissions associated with these types of applications and/or QoS requirements, the adjustment of the size of the buffer may be limited. For example, while increasing a buffer size can improve or mitigate packet losses, it can also increase a latency of a data transmission, as more packets get queued in a larger buffer, resulting in longer times to process the queue of packets. Thus, if a data transmission is associated with a low latency requirement, the buffer size may not be increased, or may be increased by a very limited amount. The latency (or any other QoS parameter) can be monitored, and the requirement satisfied by limiting adjustment of the buffer. In an exemplary embodiment, adjusting the size of the buffer is performed selectively based on a quality of service class identifier (QCI) of the data transmission, since the QCI is associated with different QoS requirements and/or parameters. Thus, wireless devices attached to an access node using a specific radio access technology (e.g. 4G, 5G, TDD, FDD, etc.) are ensured quality of service based on real-time adjustment of buffers associated with the specific radio access technology. For example, packet losses at each port can be monitored in real time, and the size of the one or more different buffers can be adjusted based in part on the packet loss determined at each port.

Figure 6:
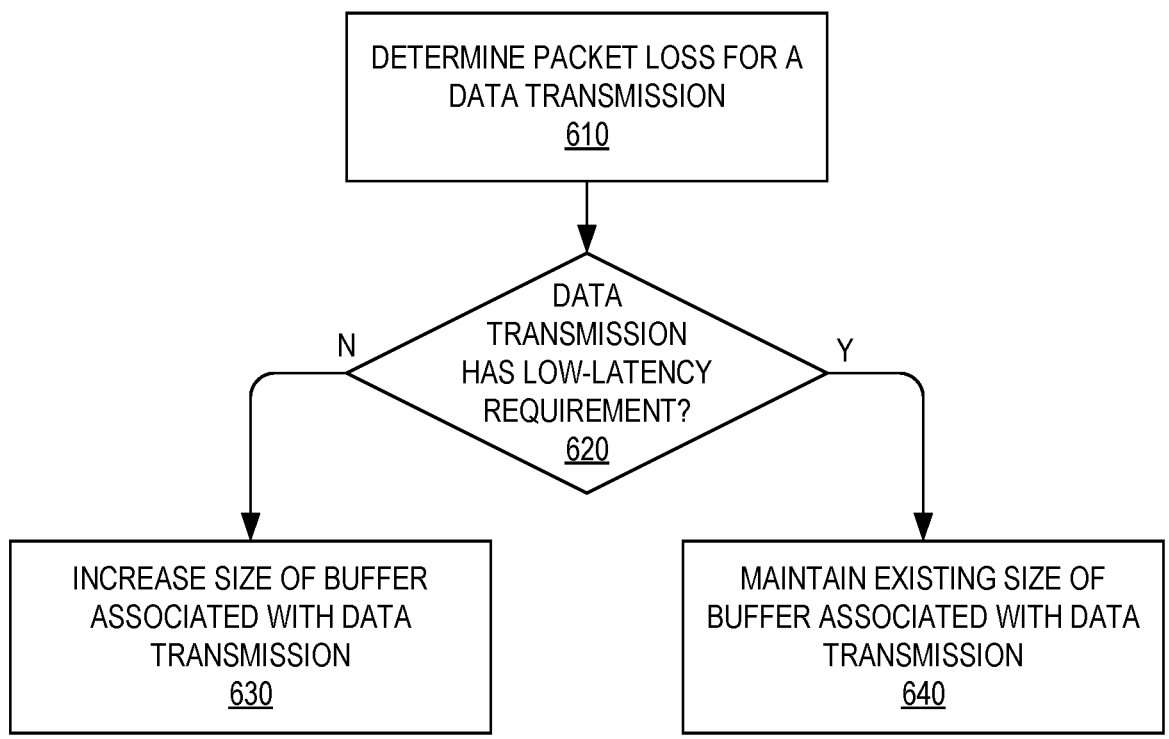
FIG. 6 depicts another exemplary method for mitigating packet loss at a cell site router.

FIG. 6 depicts another exemplary method for mitigating packet loss at a cell site router. The exemplary method of FIG. 5 may be implemented using components similar to those described above, such as cell site router 115, 215.

Although FIG. 5 depicts steps performed in a particular order for purposes of illustration and discussion, the operations discussed herein are not limited to any particular order or arrangement. One skilled in the art, using the disclosures provided herein, will appreciate that various features described herein can be omitted, rearranged, combined, and/or adapted in various ways.

At 610, at packet loss is determined for a data transmission. The data transmission may comprise any type of data transmission, such as a streaming session, VoIP call, etc. The packet loss can be determined at any network node between a source and destination network node. Further, as described above, increasing a buffer size of a buffer at a cell site router associated with the data transmission may alleviate the packet loss. However, in some cases, the data transmission may have a low latency requirement. For example, the low latency requirement may be required by applications such as voice over IP (VoIP), gaming, etc. At 620, it is determined whether or not the data transmission is associated with these types of applications and/or latency requirement. If it is determined that the data transmission does not have a low latency requirement (i.e. if the data transmission is related to a one-way stream, download, IoT, or other similar transmission), then at 630 the size of the buffer associated with the data transmission is increased. If it is determined that the data transmission has a low latency requirement, then at 640 the buffer size is maintained. For example, while increasing a buffer size can improve or mitigate packet losses, it can also increase a latency of a data transmission, as more packets get queued in a larger buffer, resulting in longer times to process the queue of packets. Thus, if a data transmission is associated with a low latency requirement, the buffer size may not be increased. In an exemplary embodiment, determining whether or not the data transmission is associated with the low latency requirement at 620 is based on a quality of service class identifier (QCI) of the data transmission, since the QCI is associated with different QoS requirements and/or parameters.

Figure 7:
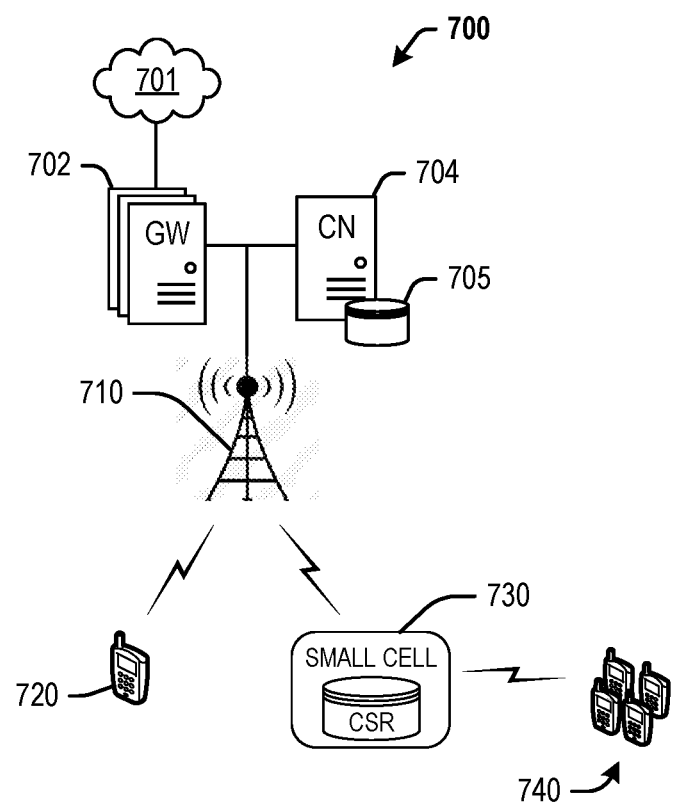
FIG. 7 depicts another exemplary system for mitigating packet loss at a cell site router.

FIG. 7 depicts an exemplary system 700 for mitigating packet loss at a cell site router. System 700 comprises components similar to system 100, including a communication network 701, gateway node(s) 702, controller node 704, access node 710, and wireless device 720. System 700 further includes a small cell 730 and end-user wireless devices 740. Access node 710 may be a macrocell access node configured to deploy wireless air-interfaces to which wireless device 720 and small cell 730 can attach. For example, access node 710 can include a combination of a 4G eNodeB and a 5G gNodeB. In other words, the access node 710 can comprise antennae that are configured to communicate using 4G LTE (i.e. the first RAT) as well as antennae that are configured to communicate using 5G NR (the second RAT). Further, the access node 710 can include a plurality of antennae (or antenna elements), a portion of which is configured to deploy a first bandwidth or RAT (e.g. 4G LTE), and a portion of which is configured to deploy a second bandwidth or RAT (e.g. 5G NR). Consequently, wireless device 120 and small cell 730 are respectively capable of attaching to 4G and 5G RATs. Further, small cell 730 can be configured to deploy another radio air interface to which end-user wireless devices 740 can attach. Thus, small cell 730 can be configured to relay data packets between access node 710 (hereinafter referred to as a "donor" access node) and end-user wireless devices 740. Thus, end-user wireless devices 740 that are outside a coverage area of donor access node 710 can access network services from donor access node 710 by virtue of being connected to small cell 730.

In this exemplary embodiment, small cell 730 includes a cell site router that is configured to route incoming data packets from network 701 (via gateway node 702 and access node 710), and to route outgoing data packets originating at wireless devices 740. Further, as described herein, the cell site router at small cell 730 is configured to mitigate packet losses by adjusting a size of a buffer located within the cell site router. The buffers may be associated with different ports of the cell site router (e.g. a 4G port and a 5G port, or ports associated with different frequencies deployed by small cell 730), to minimize the packet drops for one or more of data transmissions between end-user wireless devices 740 and network 701. Further, since increasing the buffer size can increase a latency of a data transmission, a latency requirement of the end-user wireless devices 740 is also considered when adjusting buffer sizes, so as to minimize impacts to the latency and/or other QoS requirements.

Further, the methods, systems, devices, networks, access nodes, and equipment described herein may be implemented with, contain, or be executed by one or more computer systems and/or processing nodes. The methods described herein may also be stored on a non-transitory computer readable medium. Many of the elements of system 100 may be, comprise, or include computers systems and/or processing nodes. This includes, but is not limited to: cell site router 115, gateway node(s) 102, controller node 104, access node 110, and/or network 101.

Figure 8:
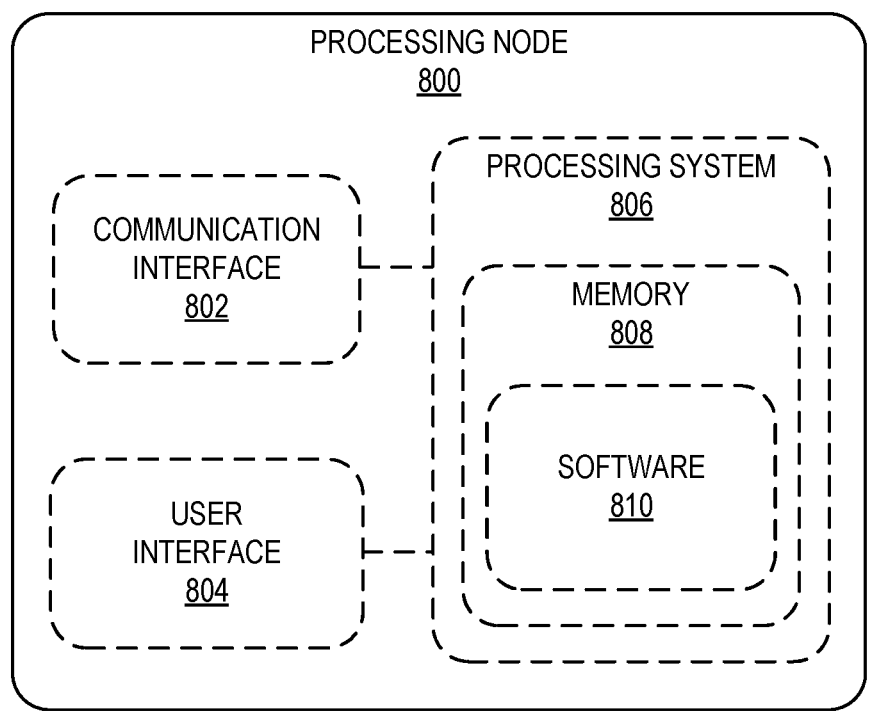
FIG. 8 depicts an exemplary processing node for mitigating packet loss at a cell site router.

FIG. 8 depicts an exemplary processing node for scheduling resources for relay access nodes in a wireless network. Processing node 800 comprises a communication interface 802, user interface 804, and processing system 806 in communication with communication interface 802 and user interface 804. Processing system 806 includes storage 808, which can comprise a disk drive, flash drive, memory circuitry, or other memory device. Storage 808 can store software 810 which is used in the operation of the processing node 800. Storage 808 may include a disk drive, flash drive, data storage circuitry, or some other memory apparatus. For example, storage 808 may include a buffer. Software 810 may include computer programs, firmware, or some other form of machine-readable instructions, including an operating system, utilities, drivers, network interfaces, applications, or some other type of software. For example, software 810 may include a module for performing transmission power control operations described herein. Processing system 806 may include a microprocessor and other circuitry to retrieve and execute software 810 from storage 808. Processing node 800 may further include other components such as a power management unit, a control interface unit, etc., which are omitted for clarity. Communication interface 802 permits processing node 800 to communicate with other network elements. User interface 804 permits the configuration and control of the operation of processing node 800.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method for mitigating packet loss, the method comprising:
   determining a first packet loss at a cell site router coupled to a small cell provided between a wireless device and an access node, the packet loss being associated with a first data transmission between the wireless device and a destination node via at least the small cell, the cell site router, and the access node, the first data transmission utilizing a first radio access technology (RAT) and traversing a first port of the cell site router, the port being associated with the first RAT;
   determining a second packet loss at the cell site router, the second packet loss being associated with a second data transmission between the wireless device and the destination node, the second data transmission utilizing a second RAT and traversing a second port of the cell site router, the second port being associated with the second RAT;
   adjusting a size of a first buffer of the port associated with the first RAT based in part on the first packet loss and on a first quality of service (QoS) requirement; and
   adjusting a size of a second buffer of the port associated with the second RAT based in part on the second packet loss and on a second QoS requirement.

2. The method of claim 1, further comprising:
   monitoring for packet loss at each of the first port and the second port; and
   adjusting the size of the first buffer and the second buffer based in part on the packet loss determined at each of the first port and the second port.

3. The method of claim 1, further comprising:
   determining that the first data transmission or the second data transmission is associated with a low latency requirement; and
   limiting the adjustment of the size of the corresponding first buffer or second buffer.

4. The method of claim 1, further comprising selectively adjusting the size of the first buffer or the second buffer based on a quality of service class identifier (QCI) of the corresponding first data transmission or second data transmission.

5. The method of claim 1, further comprising:
   determining an increase in the first packet loss or the second packet loss; and
   increasing the size of the corresponding first buffer or second buffer.

6. The method of claim 5, further comprising increasing the size of the first buffer or second buffer responsive to determining that the respective first packet loss or second packet loss has increased beyond a corresponding incremental threshold.

7. The method of claim 6, further comprising increasing the size of the first buffer or second buffer by an incremental amount associated with the corresponding incremental threshold.

8. The method of claim 1, further comprising:
   determining a decrease in the first packet loss or the second packet loss; and
   reducing the size of the corresponding first buffer or second buffer.

9. The method of claim 8, further comprising reducing the size of the first buffer or the second buffer responsive to determining that the corresponding first packet loss or second packet loss has decreased beyond a corresponding incremental threshold.

10. The method of claim 9, further comprising reducing the size of the first buffer or the second buffer by an incremental amount associated with the corresponding incremental threshold.

11. The method of claim 1, wherein:
    the cell site router is configured to receive the first or second data transmissions from the wireless device and transmit the first and second data transmissions to the destination node via the access node.

12. The method of claim 1, wherein:
    determining the first packet loss or the second packet loss is based on monitoring trends of packet losses at different times, and
    adjusting the size of the first buffer or the second buffer is performed based on the trends.

13. A system for mitigating packet loss at a buffer of a cell site router, the system comprising:
    an access node configured to provide wireless services;
    a small cell attached to the access node and configured to provide wireless access to a wireless device attached to the small cell via a first radio access technology (RAT) and a second RAT; and
    a cell site router communicatively coupled to the small cell, the cell site router configured to transmit data between the wireless device and the access node; and
    a processor communicatively coupled to the cell site router, the processor being configured to perform operations comprising:
       determining a first packet loss occurring at a first port of the cell site router, the port being associated with the first RAT;
       adjusting a size of a first buffer associated with the first port based on the first packet loss;
       determining a second packet loss occurring at a second port of the cell site router, the second port being associated with the second RAT; and
       adjusting a size of a second buffer associated with the second port based on the second packet loss.

14. The system of claim 13, wherein the first RAT comprises one or more of time-division-duplexing (TDD), frequency-division-duplexing (FDD), 3G, 4G, or 5G.

15. A processing node for mitigating packet loss, the processing node being configured to perform operations comprising:
  determining a first packet loss at a cell site router coupled to a small cell provided between a wireless device and an access node, the first packet loss being associated with a first data transmission between the wireless device and a destination node via at least the small cell, the cell site router, and the access node, the first data transmission utilizing a first radio access technology (RAT) and traversing a first port of the cell site router, the first port being associated with the first RAT; wherein the first data transmission is associated with a first quality of service (QoS) requirement; and
  determining a second packet loss at the cell site router, the second packet loss being associated with a second data transmission between the wireless device and the destination node, the second data transmission utilizing a second RAT and traversing a second port of the cell site router, the second port being associated with the second RAT;
  adjusting a size of a first buffer of the first port associated with the first RAT based in part on the first packet loss and the first QoS requirement; and
  adjusting a size of a second duffer of the second port associated with the second RAT based in part on the second packet loss and a second QoS requirement.

16. The processing node of claim 15, wherein:
the first QoS requirement or the second QoS requirement comprises a high latency requirement, and
the operations comprise limiting adjustment of the size of the corresponding first buffer or second buffer to satisfy the latency requirement.

17. The processing node of claim 15, wherein:
the first QoS requirement or second QoS requirement does not comprise a high latency requirement, and
the operations comprise increasing the size of the corresponding first buffer or second buffer to minimize the packet loss.

* * * * *